(12) United States Patent
Ura

(10) Patent No.: US 7,149,615 B2
(45) Date of Patent: Dec. 12, 2006

(54) ABSOLUTE STEERING ANGLE DETECTION DEVICE AND ABSOLUTE STEERING ANGLE DETECTION METHOD FOR ELECTRIC POWER STEERING DEVICE

(75) Inventor: Noritake Ura, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 236 days.

(21) Appl. No.: 10/515,336

(22) PCT Filed: Jul. 4, 2003

(86) PCT No.: PCT/JP03/08511

§ 371 (c)(1),
(2), (4) Date: Dec. 2, 2004

(87) PCT Pub. No.: WO2004/005843

PCT Pub. Date: Jan. 15, 2004

(65) Prior Publication Data

US 2005/0236221 A1    Oct. 27, 2005

(30) Foreign Application Priority Data

Jul. 4, 2002    (JP) .............................. 2002-196131

(51) Int. Cl.
*B62D 5/04*    (2006.01)
*H04B 1/08*    (2006.01)

(52) U.S. Cl. .......................... 701/41; 180/443; 180/41; 702/151; 324/86

(58) Field of Classification Search .................. 701/41; 180/443; 324/86; 702/151
See application file for complete search history.

(56) References Cited

U.S. PATENT DOCUMENTS

| 4,564,214 | A | * | 1/1986 | Tokunaga et al. | ........ 280/5.512 |
| 4,626,994 | A | * | 12/1986 | Yabe et al. | .................... 701/41 |
| 4,747,055 | A | * | 5/1988 | Eto et al. | ........................ 701/1 |
| 4,798,050 | A | * | 1/1989 | Nakamura et al. | ............ 60/329 |
| 5,195,603 | A | * | 3/1993 | Sugiyama | ................... 180/415 |
| 5,238,078 | A | * | 8/1993 | Harada | ........................ 180/415 |
| 5,239,490 | A | * | 8/1993 | Masaki et al. | ................. 702/41 |
| 5,282,137 | A | * | 1/1994 | Suzuki et al. | .................. 701/85 |
| 5,353,004 | A | * | 10/1994 | Takemoto et al. | ............ 338/50 |
| 5,437,583 | A | * | 8/1995 | Shibahata et al. | .......... 475/220 |
| 5,518,463 | A | * | 5/1996 | Shibahata et al. | .......... 475/220 |
| 5,866,812 | A | * | 2/1999 | Nishihara et al. | .......... 73/146.2 |
| 5,881,836 | A | * | 3/1999 | Nishimoto et al. | ......... 180/446 |

(Continued)

FOREIGN PATENT DOCUMENTS

EP    1026068    8/2000

(Continued)

*Primary Examiner*—Cuong Nguyen
(74) *Attorney, Agent, or Firm*—Oblon, Spivak, McClelland, Maier & Neustadt, P.C.

(57) ABSTRACT

A steering angle θt detected by the torque sensor is read at S900. Then, an electrical angle θm corresponding to a motor rotational angle is read at S902. At S908 through S922, motor rotational numbers are calculated based on θt, θm and the rotational number of a handle, and a correct rotational number of the handle is calculated from the motor rotational number which is the nearest to an integer of all of the calculated motor rotational numbers. Thereafter, an absolute steering angle which is not influenced by various errors is calculated based on the calculated rotational number of the handle and the steering angle θt detected by the torque sensor.

6 Claims, 8 Drawing Sheets

U.S. PATENT DOCUMENTS

| | | | |
|---|---|---|---|
| 6,041,884 A * | 3/2000 | Shimizu et al. | 180/443 |
| 6,411,867 B1 * | 6/2002 | Sakiyama et al. | 701/1 |
| 6,527,079 B1 * | 3/2003 | Takeuchi et al. | 180/443 |
| 6,957,713 B1 * | 10/2005 | Tomita | 180/446 |
| 2003/0046012 A1 | 3/2003 | Yamaguchi | |
| 2005/0236221 A1 * | 10/2005 | Ura | 180/443 |
| 2006/0185927 A1 * | 8/2006 | Sakamoto et al. | 180/443 |

FOREIGN PATENT DOCUMENTS

| | | |
|---|---|---|
| EP | 1 376 882 A2 * | 1/2004 |
| JP | 2001-194251 | 7/2001 |
| JP | 2002-81961 | 3/2002 |
| JP | 2002-90109 | 3/2002 |

* cited by examiner

FIG. 9(A) Steering Angle (θt) detected by Torque Sensor

FIG. 9(B) Output (θm) from Motor Resolver

ABSOLUTE STEERING ANGLE DETECTION DEVICE AND ABSOLUTE STEERING ANGLE DETECTION METHOD FOR ELECTRIC POWER STEERING DEVICE

TECHNOLOGICAL FIELD

The present invention relates to an absolute steering angle detection device and an absolute steering angle detection method, as used in an electric power steering device, for detecting the absolute steering angle of a multi-rotational member rotatable through multiple turns more that one turn or, in particular, of a steering wheel.

BACKGROUND ART

Heretofore, there have been known electric power steering devices of the type that an assist force by an electric motor is applied to a steering mechanism for reducing the steering force to be exerted on a steering wheel (hereafter referred to as "handle"). Various controls in the electric power steering device utilize the absolute steering angle (the position indicating the angle from a neutral position) of the handle rotatable through a limited number of rotations which is more than one. The "neutral position" means the position which the handle takes when tires are steered to direct the vehicle straight-ahead.

A rotational angle sensor is generally known as a sensor for detecting the absolute steering angle of the handle. The rotational angle sensor is composed of a slit disc with plural slits which is provided to rotate bodily with the handle and three sets of photo interrupters provided on a steering column in a fixed state.

Of the three sets of photo interrupters, two sets of photo interrupters are provided for detecting the rotational amount and the rotational direction of the slit disc, and the remaining one set of photo interrupters is provided for detecting a neutral position within every one of rotations of the handle. Output signals from these are used for controlling the vehicle.

The range over which the handle is manually rotatable is generally not within one rotation (360 degrees) and for example, extends ±720 degrees (four turns) including 2 rotations (720 degrees) in the leftward direction and 2 rotations (720 degrees) in the rightward direction. However, when an output is given from the one set of photo interrupters for neutral position detection of the foregoing rotational angle sensor, it is uncertain which rotation the output indicates of the four rotations. Thus, it is unable to detect a precise absolute steering angle based on the output signal only from the rotational angle sensor. For this reason, various means have been employed for detecting the absolute steering angle by the use of the output signal from the rotational angle sensor.

Further, recently, cost reduction has been required in detecting the absolute steering angle of the handle. However, in the prior art, a problem has arisen in that in addition to the rotational angle sensor of the aforementioned complicated configuration, a device has to be further provided for detecting the ordinal number of a rotation the handle is making.

An electric motor of an electric power steering device is provided with a resolver as a device for detecting the rotation of the motor and is also provided with a torque sensor as a device for detecting the steering torque of the handle. Since each of these outputs a rotational angle signal, it may be conceivable to utilize the signals for the purpose of cost reduction. However, where an attempt is made to detect the absolute steering angle by the use of the resolver signals of the electric motor, it is uncertain which angular position a rotor of the resolver takes within one revolution or frequency of the electrical angle. This makes it difficult to identify the absolute steering angle of the handle.

Further, the resolver of the torque sensor is of the nature that detects the torsion of a torsion bar which is provided between an input shaft coupled to the handle and an output shaft, and because the resolver of the torque sensor also outputs plural signals, per rotation of the handle, it is difficult to identify the absolute rotational angle of the handle. Therefore, it has been unable to detect the absolute steering angle of the handle even by individually using the signals output from the resolvers of the electric motor and the torque sensor.

Moreover, there is known an absolute steering angle detection method for a handle which is described in, for example, Japanese patent application No. 2001-268388 (hereafter referred to as "prior art"). According to the absolute steering angle detection method for a handle, a first detection signal is linearly output in dependence on the rotational angle of the handle from first detection means for torque detection which detects the steering torque of the handle. A second detection signal different in frequency from that of the first detection means is linearly output from second detection means for detecting the rotation of a motor which is driven in dependence on the rotation of the handle to assist the rotation of the handle. An absolute steering angle is calculated by calculation means based on the difference between the first and second detection signals and also based on a reference difference per rotation of the handle between the both detection signals.

However, in the aforementioned prior art, a problem remains unsolved in that the absolute steering angle cannot be detected precisely for the reason that there are not taken into consideration any error in steering angle precision of the resolver of the torque sensor, the looseness between gears connecting the handle with the electric motor, any error in electrical angle absolute precision of the resolver of the electric motor, and the like.

Accordingly, the present invention is made in view of the unsolved problem in the prior art, and it is an object of the present invention to provide an absolute steering angle detection device and an absolute steering angle detection method for an electric power steering device which are capable of precisely detecting the absolute steering angle even in the existence of the error in steering angle precision of the resolver of the torque sensor, the looseness between gears connecting the handle with the electric motor, the error in electrical angle absolute precision of the resolver of the electric motor, and the like.

DISCLOSURE OF THE INVENTION

In order to accomplish the foregoing object, in a first aspect of the present invention, an absolute steering angle detection device for an electric power steering device is technologically characterized by comprising: a steering wheel; a motor for assisting the rotation of the steering wheel; first detection means for detecting the steering torque of the steering wheel to linearly output a first detection signal in dependence on the rotational angle of the steering wheel; second detection means for detecting the rotation of a motor which is driven in dependence on the rotation of the steering wheel to assist the rotation of the steering wheel, to linearly output a second detection signal having a frequency different from that of the first detection signal; first operation means for calculating rotational numbers of the motor based on the first and second detection signals and the rotational number of the steering wheel; first selection means for selecting an appropriate rotational number from the rotational numbers of the motor calculated by the first operation means; second selection means for selecting a rotational number of the steering wheel which corresponds to the appropriate rotational number selected by the first selection means; and second operation means for calculating an absolute steering angle based on the rotational number of the steering wheel selected by the second selection means and the first detection signal.

According to the first aspect of the present invention, the first detection signal is output linearly in dependence on the rotation of the steering wheel from the torque detection first detection means for detecting the steering torque of the steering wheel. Further, the second detection signal having a frequency different from that of the first detection signal is output from the second detection means for detecting the rotation of the motor which is driven in dependence on the rotation of the steering wheel to assist the rotation of the steering wheel. Then, the rotational numbers of the motor are calculated based on the first and second detection signals and all of the possible rotational numbers of the steering wheel. Then, an appropriate rotational number is selected from the calculated rotational numbers of the motor, and a rotational number of the steering wheel is selected in correspondence to the appropriate rotational number. Then, the absolute steering angle is calculated based on the rotational number of the steering wheel and the first detection signal. Accordingly, it can be realized to provide the absolute steering angle detection device for an electric power steering device which is precise even in the existence of the error in precision of the steering angle from the resolver of the torque sensor, the looseness between gears connecting the handle with the electric motor, the error in absolute precision of the electrical angle of the resolver in the electric motor, and the like.

In order to accomplish the foregoing object, in a second aspect of the present invention, the absolute steering angle detection device for an electric power steering device is technologically characterized in that the first and second detection means are constituted respectively by resolvers.

According to the second aspect of the present invention, it can be realized to detect the absolute steering angle based on the first and second detection signals which are output respectively from the resolver for torque detection and the resolver for motor rotation detection. The resolver for detecting the steering torque and the motor resolver for detecting the motor rotational angle are commonly used as the absolute steering angle detection device, i.e., to serve as a resolver for torque detection, a resolver for detection of the motor rotational angle which are necessary to detect the absolute steering angle $\theta$. Accordingly, unlike the prior art, it is unnecessary to additionally provide any rotational angle sensor thereby reducing the cost, so that the absolute steering angle $\theta$ can be detected successfully.

Also in order to accomplish the foregoing object, in a third aspect of the present invention, the absolute steering angle detection device for an electric power steering device is technologically characterized in that the first detection means is composed of at least two resolvers which do not take the same values during one rotation of the steering wheel.

According to the third aspect of the present invention, the first resolver is used on a first rotational axis which is coupled to the steering wheel, the second resolver is used for detecting the rotational angle of a second rotational shaft which is coupled to the first rotational shaft through a torsion bar, and the first resolver and the second resolver are constituted not to take the same values during one rotation of the steering wheel. Thus, it can be realized to detect the absolute steering angle within one rotation of the steering wheel based on the first detection signal which is the result of the calculation of the outputs from the first and second resolvers. The first resolver and the second resolver for detecting the steering torque and the motor resolver for detecting the motor rotational angle are commonly used as the absolute steering angle detection device, i.e., to serve as a first resolver, a second resolver and a motor resolver which are necessary to detect the absolute steering angle $\theta$. Accordingly, unlike the prior art, it is unnecessary to additionally provide any rotational angle sensor thereby reducing the cost, so that the absolute steering angle $\theta$ can be detected successfully.

Also in order to accomplish the foregoing object, in a fourth aspect of the present invention, the absolute steering angle detection device for an electric power steering device is technologically characterized in that the first selection means selects a numerical value which is the nearest to an integer.

According to the fourth aspect of the present invention, all of the rotational numbers of the motor which is driven in dependence on the rotation of the steering wheel to assist the rotation of the steering wheel are detected to select therefrom the rotational number which is the nearest to an integer, so that a correct rotational number of the steering wheel can be selected.

Also in order to accomplish the foregoing object, in a fifth aspect of the present invention, the absolute steering angle detection device for an electric power steering device is technologically characterized in that the second operation means detects the absolute steering angle by addition means for adding the first detection signal to a value which is made by multiplying 360 with the rotational number of the steering wheel selected by the second selection means.

According to the fifth aspect of the present invention, it can be realized to detect the absolute steering angle of the steering wheel by adding the first detection signal to the value which is obtained by multiplying 360 with the correct rotational number of the steering wheel.

Also in order to accomplish the foregoing object, in a sixth aspect of the present invention, an absolute steering angle detection method for an electric power steering device including a steering wheel and a motor for assisting the rotation of the steering wheel is technologically characterized by comprising: a first detection step for torque detection, of detecting the steering torque of the steering wheel to linearly output a first detection signal in dependence on the rotational angle of the steering wheel; a second detection step of detecting the rotation of a motor which is driven in dependence on the rotation of the steering wheel to assist the rotation of the steering wheel, to linearly output a second detection signal having a frequency different from that of the first detection signal; a first operation step of calculating rotational numbers of the motor based on the first and second detection signals and the rotational number of the steering wheel; a first selection step of selecting an appropriate rotational number from the rotational numbers of the motor calculated by the first operation step; a second selection step of selecting a rotational number of the steering wheel which corresponds to the appropriate rotational number selected at the first selection step; and a second operation step of calculating an absolute steering angle based on the rotational number of the steering wheel selected at the second selection step and the first detection signal.

According to the sixth aspect of the present invention, the first detection signal is linearly output in dependence on the rotation of the steering wheel at the first detection step of detecting the steering torque of the steering wheel. Further, a second detection signal having a frequency different from that of the first detection signal is linearly output at the second detection step of detecting the rotation of the motor which is driven in dependence on the rotation of the steering wheel to assist the rotation of the steering wheel. Then, the rotational numbers of the motor are calculated based on the first and second detection signals and all of the possible rotational numbers of the steering wheel. Then, an appropriate rotational number is selected from the calculated rotational numbers of the motor, and a rotational number of the steering wheel is selected in correspondence to the appropriate rotational number. Then, the absolute steering angle is calculated based on the rotational number of the steering wheel and the first detection signal. Accordingly, it can be realized to provide the absolute steering angle detection method for an electric power steering device which can be precise even in the existence of the error in precision of the steering angle from the resolver of the torque sensor, the looseness between gears connecting the handle with the electric motor, the error in absolute precision of the electrical angle of the resolver in the electric motor, and the like.

PREFERRED EMBODIMENT TO PRACTICE THE INVENTION

Hereafter, description will be made with reference to FIG. 1 through FIG. 10 as to one embodiment which embodies an absolute steering angle detection device and an absolute steering angle detection method for detecting the absolute rotational angle of a handle (hereinafter referred to as "absolute steering angle) in an electric power steering device.

Figure 1:
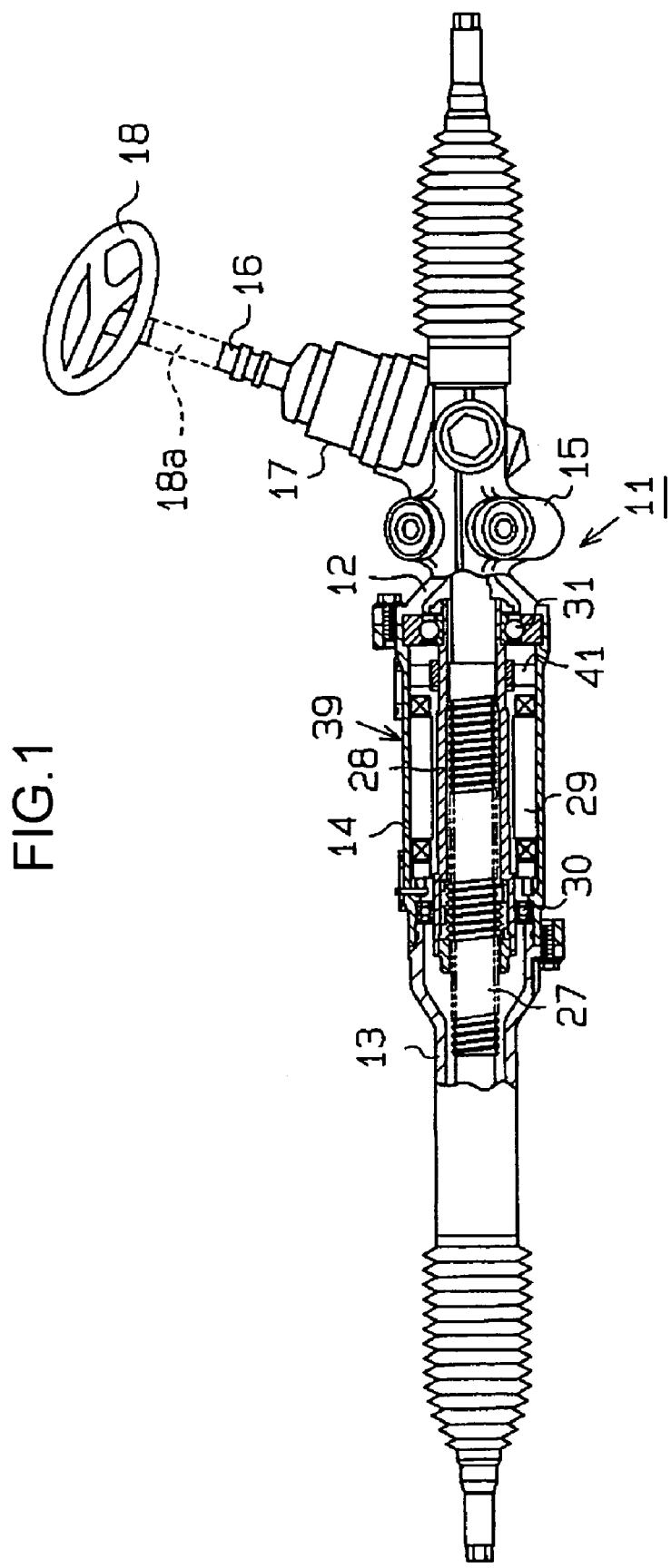
FIG. 1 shows a constructional view of an electric power steering device.

FIG. 1 shows the electric power steering device 11. A first rack housing 12 of a hollow cylindrical shape, a second rack housing 13 of a hollow cylindrical shape and a motor housing 14 of a hollow cylindrical shape which is joined with the both rack housings in axial alignment are supported on a body of the vehicle (not shown) with the first rack housing 12 being screw-fixed thereon at a mount portion 15 thereof.

The first rack housing 12 has coupled thereto a pinion housing 17 having a pinion shaft 16. The pinion shaft 16 is connected to a steering shaft 18a extending from the handle 18 side, and the rotational manipulation of the handle 18 causes the pinion shaft 16 to be rotated in correspondence thereto.

Figure 2:
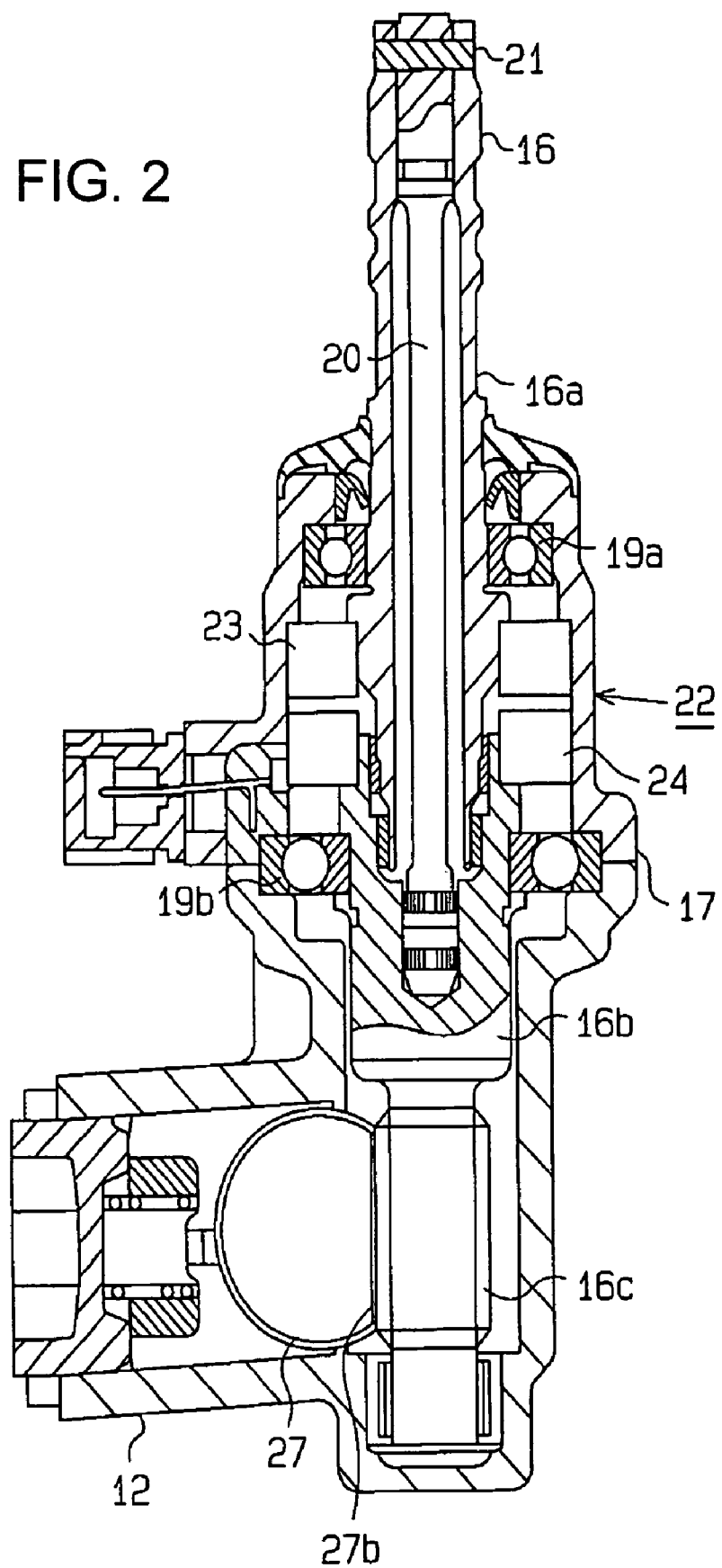
FIG. 2 shows a portion provided with a torque sensor.

As shown in FIG. 2, the pinion shaft 16 is rotatably carried in the pinion housing 17 through bearings 19a, 19b. The pinion shaft 16 is composed of an input shaft 16a and an output shaft 16b, and a pinion gear 16c is provided on an extreme end of the output shaft 16b.

A torsion bar 20 is inserted into the input shaft 16a and the output shaft 16b, which are connected to be bodily rotatable through the torsion bar 20. An input shaft side end of the torsion bar 20 is joined with the input shaft 16a by means of a pin 21, and an output shaft side end of the torsion bar 20 is joined with the output shaft 16b by means of a spline connection. The torsion bar 20 yields a resilient force in the torsional direction upon relative rotation between the input shaft 16a and the output shaft 16b. Thus, the input shaft 16a constitutes a fist rotational shaft, the output shaft 16b constitutes a second rotational shaft, and the pinion shaft 16 constitutes a mechanism which connects the first rotational shaft and the second rotational shaft to be in axial alignment.

A torque sensor 22 is provided around the input shaft 16a and the output shaft 16b. The torque sensor 22 is provided with a first resolver 23 and a second resolver 24.

Figure 3:
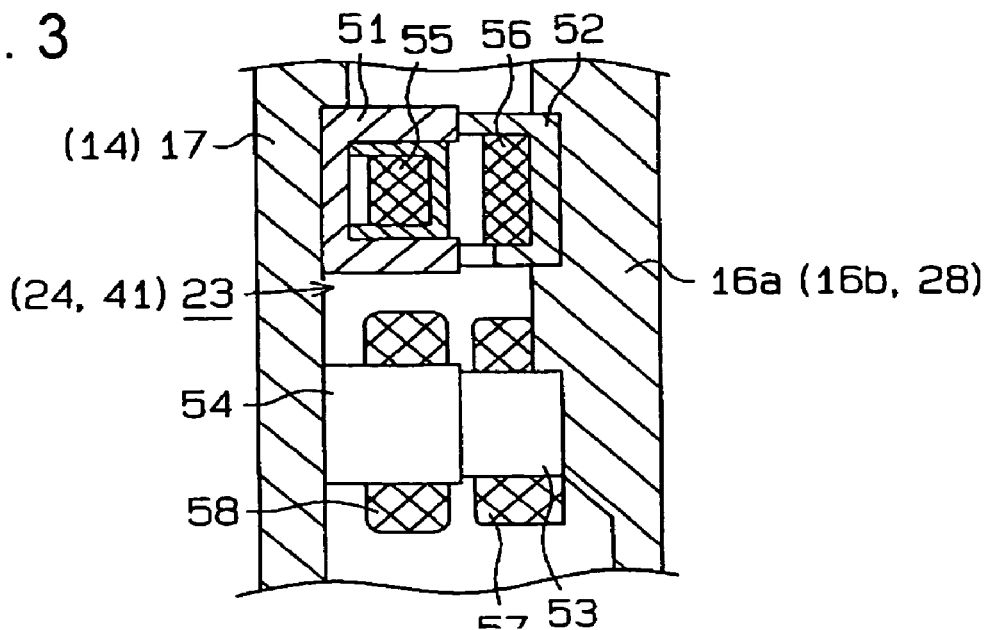
FIG. 3 shows a first resolver.

As shown in FIG. 3, the first resolver 23 is composed of first to fourth yokes 51–54 and first to fourth coils 55–58. The first yoke 51 is annually formed along the internal surface of the pinion housing 17 and is secured to the pinion housing 17. The first coil 55 is wound in the inner circumferential portion of the first yoke 51. To face to the first yoke 51, the annular second yoke 52 is provided around the input shaft 16a and is secured to the input shaft 16a to be rotatable bodily therewith. The second coil 56 is wound around the outer circumferential portion of the second yoke 52.

Further, the third yoke 53 is provided around the input shaft 16a and is secured to the input shaft 16a to be rotatable bodily therewith. The third coil 57 is wound around the third yoke 53. The third coil 57 is connected to the second coil 56. To face to the third coil 53, the fourth yoke 54 is secured to the internal surface of the pinion housing 17, and the fourth coil 58 is wound around the fourth yoke 54. Each of the third coil 57 and the fourth coil 58 is composed of those of two kinds which are shifted 90 degrees in phase.

Next, description will be made regarding the second resolver 24. Since the details of the second resolver 24 are almost the same as those of the aforementioned first resolver 23, the same reference numerals as the yokes 51–54 and the coils 55–58 of the first resolver 23 are used for the second resolver 24, and description will be made in respects different from those of the first resolver 23.

The second resolver 24 is composed of first through fourth yokes 51–54 and first through fourth coils 55–58. The first and fourth yokes 51, 54 and the first and fourth coils 55, 58 are provided on the pinion housing 17, while the second and third yokes 52, 53 and the second and third coils 56, 57 are provided on the output shaft 16b. Other constructions of the second resolver 24 are the same as those of the first resolver 23.

Next, the electrical characteristics of the first resolver 23, the second resolver 24 during one rotation of the handle will be described with reference to FIGS. 7(A) to 7(B)-(2). In the present embodiment, the output θt1 of the first resolver 23 has five (5) peak points per rotation of the handle, as shown in FIG. 7(B)-(1). The first resolver 23 is of the type having five N-poles and five S-poles in the electrical sense, and 360 degrees in mechanical angle correspond to 1800 (=360×5) degrees in electrical angle. This means that the first resolver 23 has a resolution of five (5) times as many as a resolver having a resolution of 360 degrees in electrical angle.

The output θt2 of the second resolver 24 has six (6) peak points per rotation of the handle, as shown in FIG. 7(B)-(2). The second resolver 24 is of the type having six N-poles and six S-poles in the electrical sense, and 360 degrees in mechanical angle correspond to 2160 (=360×6) degrees in electrical angle. This means that the second resolver 24 has a resolution of six (6) times as many as a resolver having a resolution of 360 degrees in electrical angle.

As understood from FIGS. 7(B)-(1) and 7(B)-(2), the output θt1 of first resolver 23 and the output θt2 of the second resolver 24 do not take the same values even at any rotational angle of the handle. For this reason, over one rotation of the handle, an output signal θt of a high resolution can be produced by utilizing the output θt1 of the first resolver 23 and the output θt2 of the second resolver 24.

Figure 4:
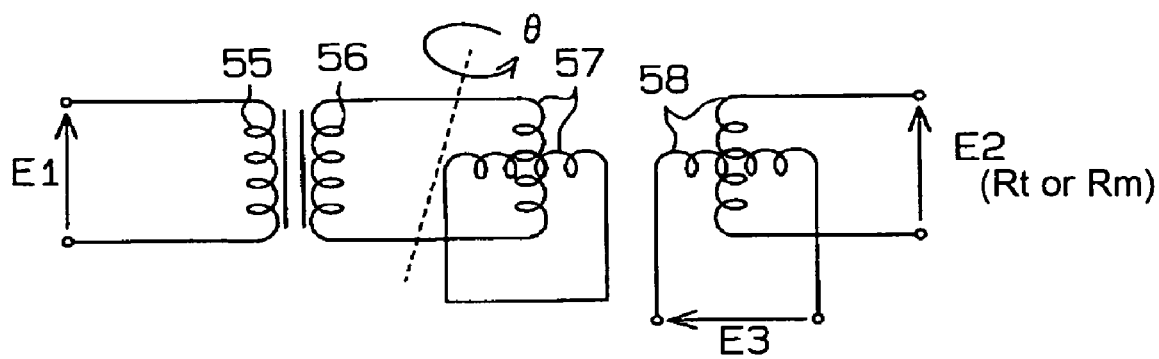
FIG. 4 shows a winding diagram for the first resolver.

Next, description will be made as to the torque detection depending on the first and second resolvers 23, 24. When the handle 18 is manipulated to rotate the input shaft 16a through a rotational angle θ1 with an alternate current voltage E1 being applied to the first coil 55 as shown in FIG. 4, a magnetic flux is generated around the first yoke 51 and the second yoke 52 in dependence upon the applied voltage. At this time, an alternate current voltage depending on the change in the magnetic flux is induced in the second coil 56. Since the second coil 56 is connected to the third coil 57, an alternate current voltage is also induced in the third coil 57. The alternate current voltage generated in the third coil 57 causes an alternate current voltage to be induced in the fourth coil 58, whereby alternate current voltages E2 and E3 are output. At this time, the alternate current voltages E2 and E3 of two kinds which are different in phase from each other are output from the fourth coil 58 which is composed of coils of two kinds, and these alternate current voltages E2, E3 respectively satisfy relations represented by the following expressions (a) and (b).

$$E2 = K \cdot E1 \times \cos\theta \quad (a)$$

$$E3 = K \cdot E1 \times \sin\theta \quad (b)$$

The symbol "K" represents the voltage transformation ratio. At this time, "θ" can be calculated from the above expressions (1) and (2), and this angle θ represents the rotational angle θ1 of the input shaft 16a.

On the other hand, the output shaft 16b which is connected to the input shaft 16a through the torsion bar 20 is also rotated upon rotation of the input shaft 16a. Thus, the rotational angle θ2 of the output shaft 16b is also calculated based on the output from the second resolver 24 provided on the output shaft 16b side by using the above expressions (a) and (b).

Upon rotations of the input shaft 16a and the output shaft 16b, the torsion bar 20 is twisted to bring about a relative rotational angle difference Δθ (=θ1−θ2) between the input shaft 16a and the output shaft 16b. As a result, a steering torque can be calculated from the relative rotational angle difference Δθ indicating the torsional angle of the torsion bar 20 and the rigidity of the torsion bar 20.

Then, a known assist control for assisting the steering force in dependence on the steering torque is carried out, wherein the steering force is assisted by an electric motor 39 referred to later, so that the steering manipulation of the handle 18 can be realized successfully.

Figure 6:
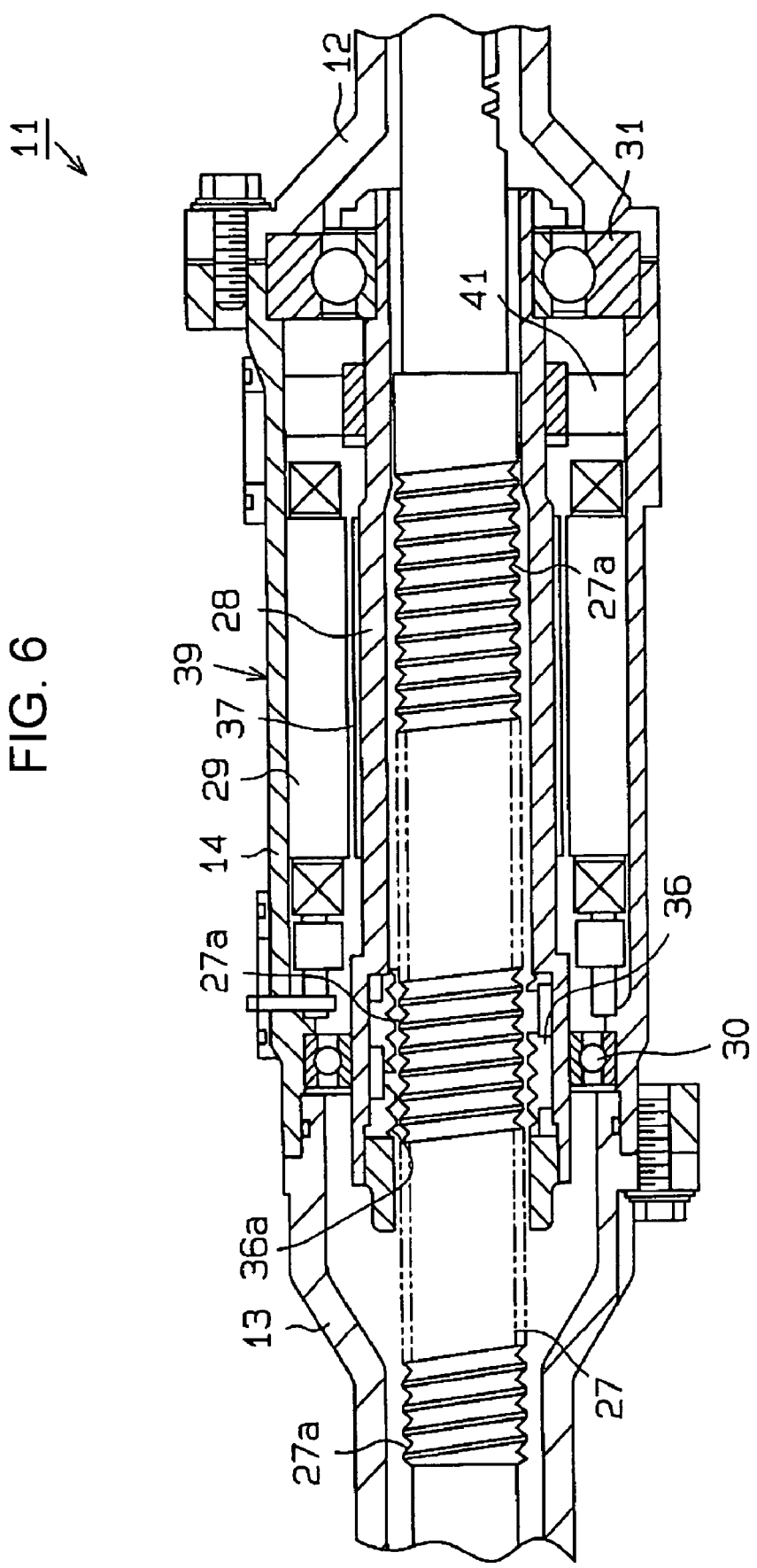
FIG. 6 shows a portion provided with an electric motor in the electric power steering device.
Figure 7:
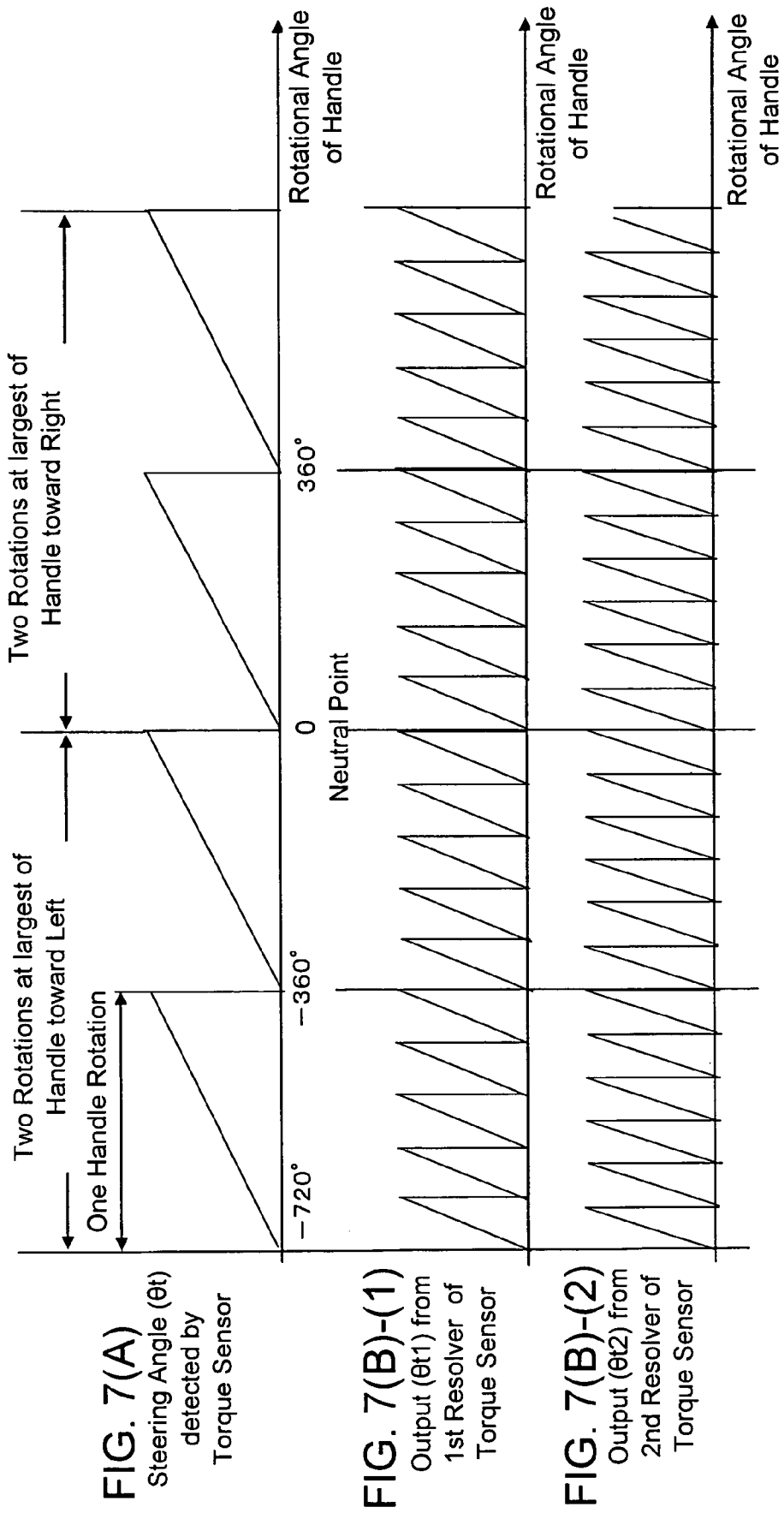
FIGS. 7(A) to 7(B)-(2) show the output waveforms from resolvers of the torque sensor.
Figure 8:
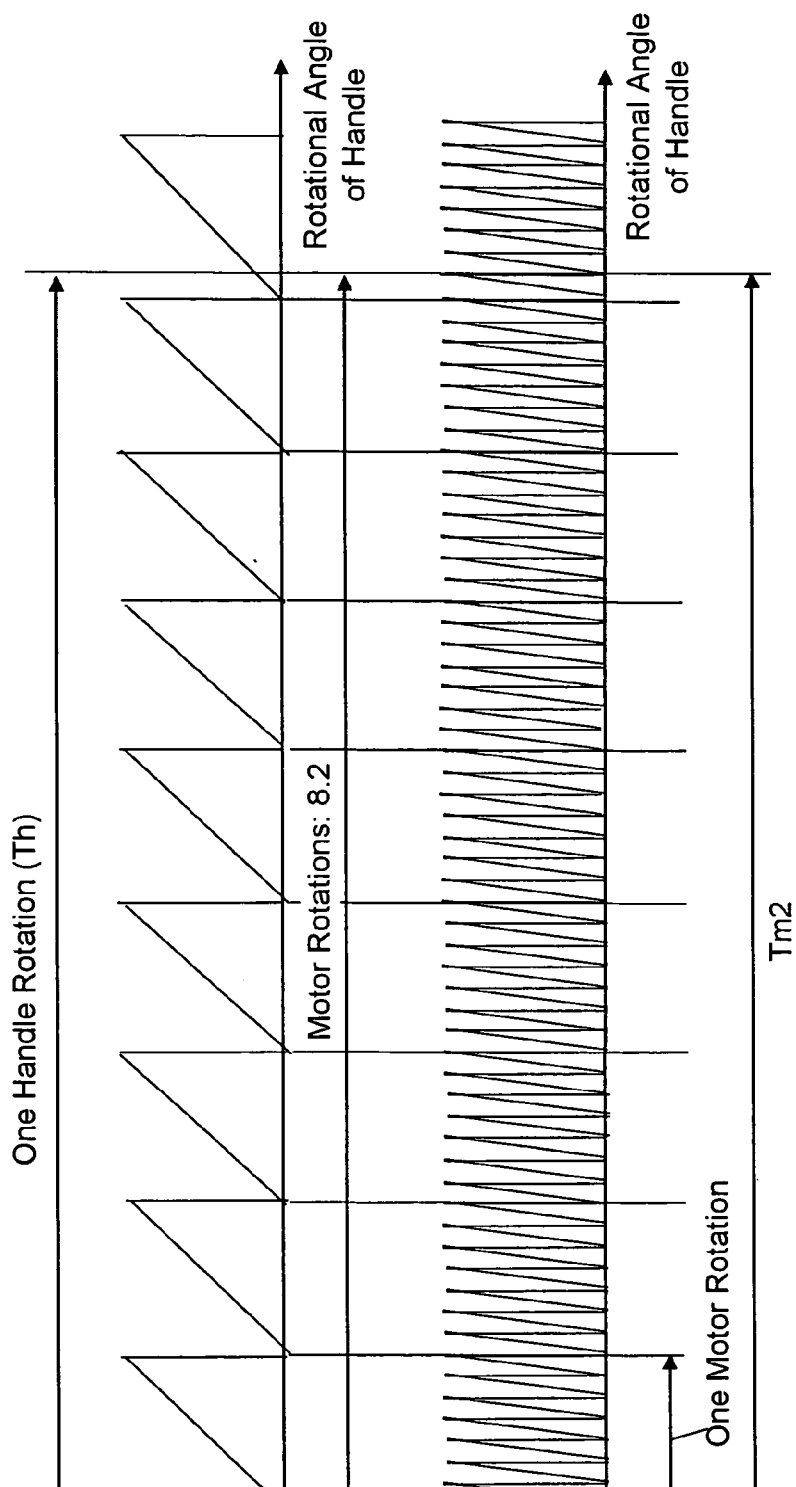
FIGS. 8(A) and 8(B) show the output waveform from a motor resolver in relation with one rotation of a handle.
Figure 9:
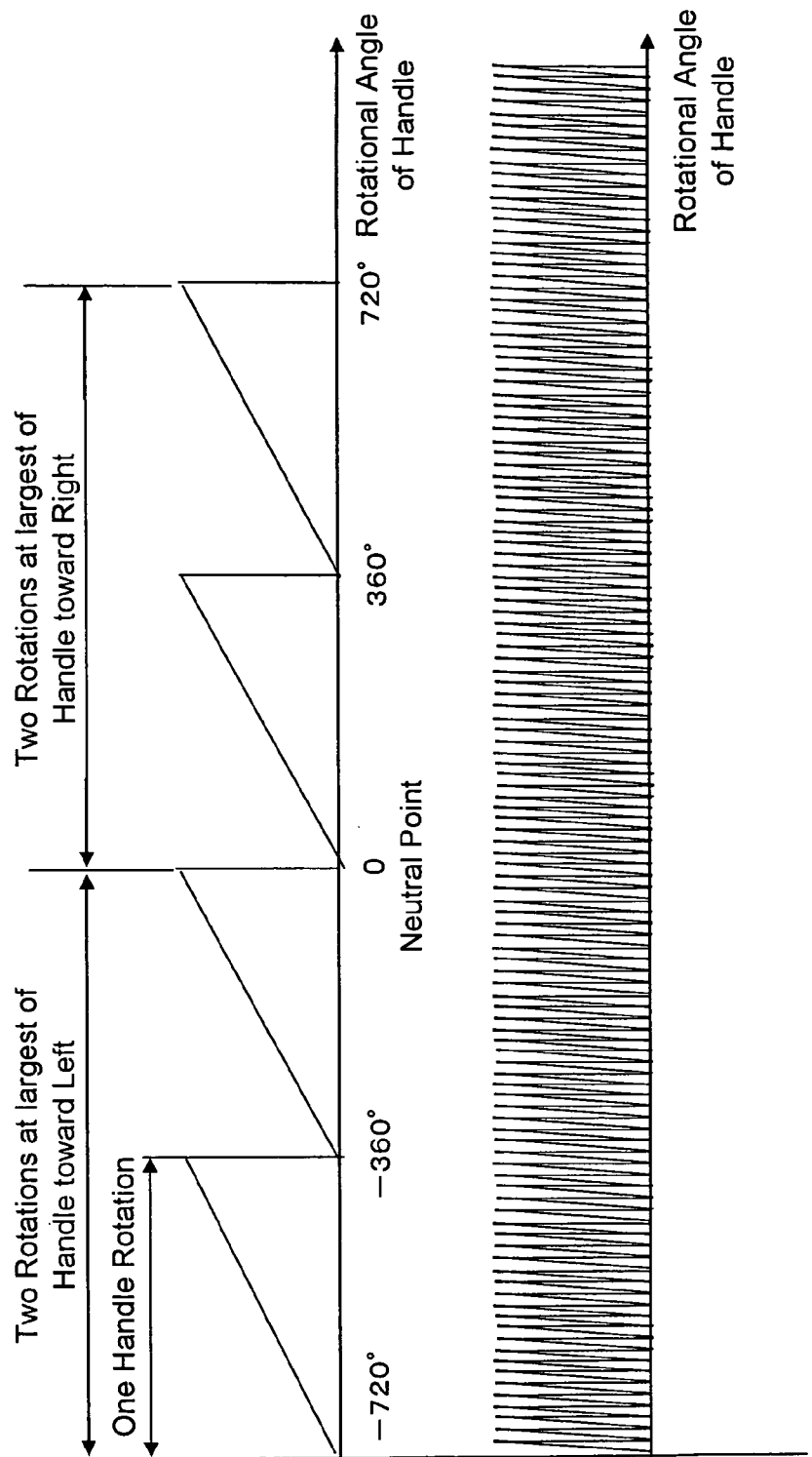
FIGS. 9(A) and 9(B) show the output waveform from the motor resolver in relation with the steering angle detected by the torque sensor.

As shown in FIGS. 1 and 6, a rack shaft 27 is incorporated to be non-rotatable but axially movable inside of a cylindrical body which is composed of the first rack housing 12, the second rack housing 13 and the motor housing 14. Opposite ends of the rack shaft 27 are coupled to left and right front wheels through tie rods (not shown), respectively. As shown in FIG. 2, the rack shaft 27 is formed with a meshing portion 27b, which is in meshing engagement with the pinion gear 16c of the pinion shaft 16 to constitute a rack-and-pinion mechanism.

As shown in FIG. 6, a stator 29 provided with windings is fit in the internal surface of the motor housing 14. A motor shaft 28 of a hollow cylindrical shape is co-axially mounted around the rack shaft 27 with a play at an intermediate portion in the axial direction of the rack shaft 27.

The motor shaft 28 is supported by the motor housing 14 through first and second bearings 30, 31. The motor shaft 28 is provided with permanent magnets 37 on the external surface thereof to be secured thereto.

A ball screw nut 36 is coaxially received in the motor shaft 28. A spiral ball screw groove 36a is formed on the internal surface of the ball screw nut 36. A spiral ball screw groove 27a is formed on the external surface of the rack shaft 27 within a predetermined area in the axial direction. A plurality of balls (not shown) are retained to be rolled between the ball screw groove 27a and the ball screw groove 36a. Thus, by this ball screw mechanism constructed by the both of the ball screw grooves 27a, 36a and the like, the rotational torques in the positive and negative directions of the motor shaft 28 are converted into reciprocation movements in the axial direction of the rack shaft 27. Then, the reciprocation movements are further converted through the pinion shaft 16 constituting the rack and pinion mechanism, into an assist force for reducing the steering force to be exerted on the handle 18. Therefore, the electric motor 39 as a motor is constituted by the aforementioned motor shaft 28, the stator 29 and the like, and the electric motor 39 is driven in dependence on the rotation of the handle 18.

Around the motor shaft 28, there is provided a motor resolver 41 serving as a motor rotational angle sensor. Since the details of the motor resolver 41 are almost the same as those of the aforementioned first resolver 23 shown in FIGS. 3 and 4, the same reference numerals as the yokes 51–54 and the coils 55–58 of the first resolver 23 are used for the motor resolver 41, and description will be made in respects different from those of the first resolver 23.

That is, the motor resolver 41 is composed of first through fourth yokes 51–54 and first through fourth coils 55–58. The first and fourth yokes 51, 54 and the first and fourth coils 55, 58 are provided on the motor housing 14, while the second and third yokes 52, 53 and the second and third coils 56, 57 are provided on the motor shaft 28. Other constructions of the motor resolver 41 are the same as those of the first resolver 23.

Herein, description will be made regarding the detection for the rotational angle of the motor shaft 28 (hereinafter referred to as "motor rotational angle"). When the motor shaft 28 is rotated to a certain rotational angle with an alternate current voltage E1 being applied to the first coil 55, a magnetic flux is generated around the first yoke 51, and the magnetic flux is applied to the second yoke 52. The magnetic flux extends across the second coil 56, whereby an alternate current voltage is induced in the second coil 56. At this time, an alternate current voltage induced in the second coil 56 is also induced in the third coil 57 connected to the second coil 56. The alternate current voltage generated in the third coil 57 causes an alternate current voltage to be induced in the fourth coil 58, whereby alternate current voltages E2 and E3 are output. Then, a motor rotational angle is calculated by the foregoing expressions (a) and (b) based on the applied alternate current voltage E1 and the output alternate current voltages E2, E3. The motor rotational angle detected in this manner can be used for various controls in the electric power steering device 11.

Figure 5:
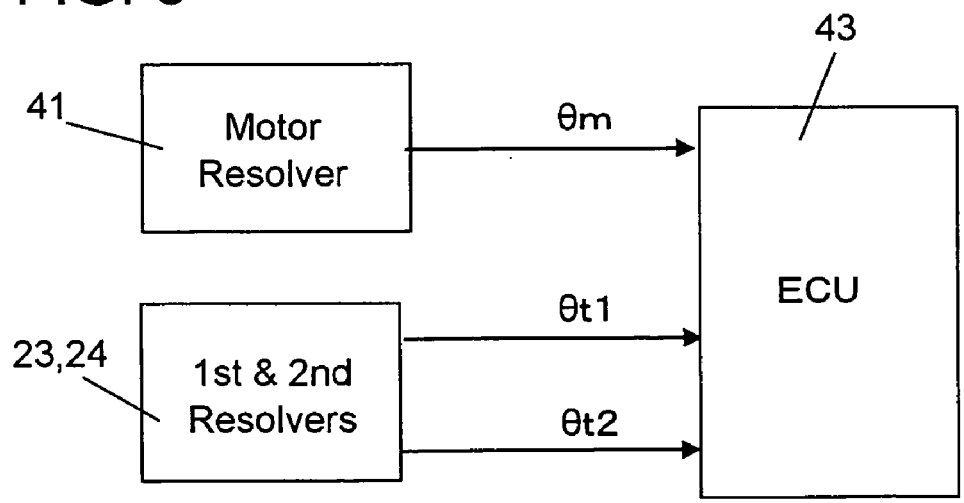
FIG. 5 is a block diagram showing the electric construction of an absolute steering angle detection device.

Next, description will be made as to an absolute steering angle detection device for the handle 18 in the electric power steering device as constructed above. As shown in FIG. 5, the first and second resolvers 23, 24 constituting the torque sensor 22 and the motor resolver 41 for detecting the motor rotational angle are electrically connected to an ECU (Electronic Control Unit) 43 as operation means. Thus, in the present embodiment, the absolute steering angle detection device is constructed by the first and second resolvers 23, 24, the motor resolver 41 and the ECU 43. The ECU 43 has input thereto the detection signals θt1, θt2 which are linearly output from the first and second resolvers 23, 24 in dependence upon the rotational angle of the output shaft 16b of the pinion shaft 16. Further, the ECU 43 has input thereto a detection signal θm which is linearly output from the motor resolver 41 in dependence upon the rotational angle of the motor shaft 28. The detection signals θt1, θt2, θm correspond to the alternate current voltages (E2 or E3) output from the fourth coils 58 which respectively constitute the first resolver 23, the second resolver 24 and the motor resolver 41. In the present embodiment, the alternate current voltages are represented by the outputs from the coils which are of the coil pairs respectively constituting the fourth coils 58 of the resolvers 23, 24, 41 and all of which output the alternate current voltages E2. As the alternate current voltages, the alternate current voltages E3 may be used in place of the alternate current voltages E2.

Then, the ECU 43 is able to detect the absolute steering angle of the handle 18 based on the detection signals θt1, θt2 and θm input thereto. In the present embodiment, the "absolute steering angle" means the angle of the handle 18 rotated away from a neutral position of the same, and the "neutral position" means the position which the handle 18 takes when tires are steered to direct the vehicle straight-ahead.

Next, description will be made as to operation expressions for performing the detection of the absolute steering angle. In the present embodiment, description will be made on the assumption that the handle 18 is rotatable within a range of ±2.0 rotations (±720 degrees). The sign "+" indicates the rotation in the clockwise direction from the neutral position, whereas the sign "−" indicates the rotation in the counter-clockwise direction from the neutral position.

The frequency Tt at which the output signal θt from the resolver of the torque sensor is detected is set to be one frequency (Tt=1). As shown in FIG. 7(A), the output signal θt varies as one revolution or frequency per rotation of the handle 18. Further, as shown in FIG. 8(B), the frequency Tm1 at which the detection signal θm from the motor resolver 41 is detected per rotation of the electric motor 39 (the motor shaft 28) is set to be seven (Tm1=7).

On the other hand, the rack shaft 27 is set to move through a distance of S mm per rotation of the handle 18. Where symbol "L" is taken as the lead given by the one rotation of the ball screw mechanism 27a, 36a provided between the rack shaft 27 and the motor shaft 28, the motor shaft 28 is rotated through S/L rotations, i.e., 8.2 rotations in the present embodiment as shown in FIG. 8(A), as the rack shaft 27 is moved through S mm. Accordingly, the frequency Tm2 at which the detection signal θm from the motor resolver 41 is detected per rotation of the handle 18 (pinion shaft 16) becomes a frequency of Tm2=57.4 (=Tm1×8.2=7×8.2), as shown in FIG. 8(B).

In the present embodiment, the relation between the handle 18, the steering angle (θt) detected by the torque sensor and the output (θm) of the motor resolver is represented as shown in FIGS. 9(A) and 9(B). The handle 18 is rotatable two rotations at the largest in either of the left and right directions. FIG. 9(A) shows the steering angle (θt) detected by the torque sensor, and the steering angle (θt) varies as one frequency per rotation of the handle 18. This is the first detection signal. FIG. 9(B) shows the output (θm) of the motor resolver during the same period of time. This is the second signal.

Now, for details, the steering angle detected by the torque sensor is taken as θt and the electrical angle of the motor rotational angle is taken as θm, wherein the respective absolute steering angels are presented by expressions.

First of all, the absolute steering angel detected by the torque sensor:

$$=\theta t + 360 \cdot A \quad\quad\quad \text{Expression (1)}$$

Herein, symbol "A" is an integer and takes the value of −2, −1, 0 or 1.

The absolute steering angel of the motor rotational angle:

$$=(\theta m + 360 \cdot B)/57.4 \quad\quad\quad \text{Expression (2)}$$

Herein, symbol "B" theoretically becomes an integer and takes a value in the range of −126 to 125 in the absence of the looseness in the mechanical train connecting the handle with the electric motor, errors in absolute precision of the electrical angles of the resolvers provided in the electric motor and the torque sensor, and the like. Since the expression (1) is equal to the expression (2), the expression below holds.

$$\theta t + 360 \cdot A = (\theta m + 360 \cdot B)/57.4$$

Hence, the motor resolver output can be represented by the expression below.

$$B = (57.4 \cdot (\theta t + 360 \cdot A) - \theta m)/360 \quad\quad\quad \text{Expression (3)}$$

Figure 10:
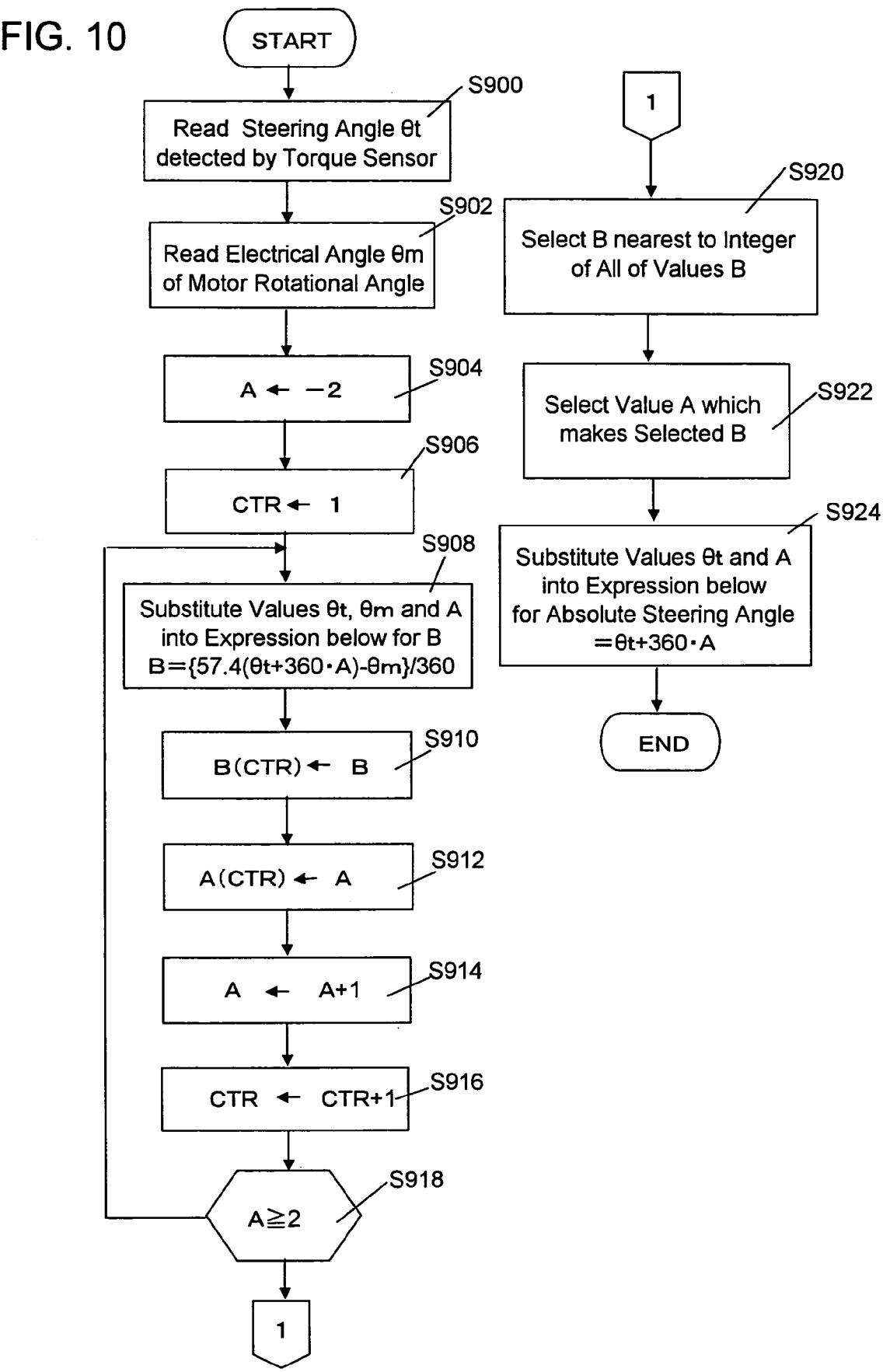
FIG. 10 is a flow chart for a calculating processing of an absolute steering angle.

The detection method for the absolute steering angle using the expressions (1) and (3) will be described in detail in accordance with a flow chart shown in FIG. 10. This flow chart starts in response to interruptions which are given at a regular time interval. In the beginning, the steering angle θt detected by the torque sensor is read at S900. This constitutes first detection means. As a specific value, there is set θt=39.5. Then, S902 is reached to read the motor rotational angle θm. This constitutes second detection means. Similarly, there is set θm=284.

Then, the routine proceeds to S904, at which the rotational number N of the handle (at first, left rotation) is substituted into symbol A. As a specific value, N=2 is set, and A=−2 is set because of two rotations in the left direction.

Then, the routine proceeds to S906 to set "1" to a counter CTR for repetition processing. Thereafter, the routine proceeds to S908, at which θt=39.5 degrees, θm=284 degrees and A=−2 are substituted into the expression (3) to calculate the motor rotational number B. This constitutes first operation means.

$$B = \{57.4 \times (39.5 + 360 \times (-2)) - 284\}/360$$
$$= -109.291$$

As represented by the specific result, the motor rotational number B becomes not an integer obtained theoretically but a value with fraction because the arithmetic expression for the motor rotational number B involves the looseness in the mechanical train connecting the handle with the electric motor and the errors in absolute precision of the electrical angles of the resolvers provided in the electric motor and the torque sensor.

Then, the routine proceeds to S910 to store the value B in a memory. Then, the routine proceeds to S912 to store the value A in the memory as well. Then, the routine proceeds to S914 to increment the value A by "1". Then, the routine proceeds to S916 to increment the value CRT by "1" as well. Then, the routine proceeds to S918 to judge whether or not the value A is larger than the value N. At this time, the judgment is executed as to whether or not the value A is greater than or equal to "2". A return is made to S908 because the value A is less than "2".

At S908, $\theta t=39.5$ degrees, $\theta m=284$ degrees and $A=-1$ are substituted into the expression (3) to calculate the motor rotational number B.

$$B = \{57.4 \times (39.5 + 360 \times (-1)) - 284\}/360$$
$$= -51.891$$

Then, the routine proceeds to S910 to store the value B in the memory. Then, the routine proceeds to S912 to store the value A in the memory as well. Then, the routine proceeds to S914 to increment the value A by "1". Then, the routine proceeds to S916 to increment the value CRT by "1" as well. Then, the routine proceeds to S918 to judge whether or not the value A is greater than or equal to "2". A return is made to S908 because the value A is less than "2" also at this time.

At S908, $\theta t=39.5$ degrees, $\theta m=284$ degrees and $A=0$ are substituted into the expression (3) to calculate the motor rotational number B.

$$B = \{57.4 \times (39.5 + 360 \times 0) - 284\}/360$$
$$= 5.509$$

Subsequently, the routine proceeds to S910 to store the value B in the memory. Then, the routine proceeds to S912 to store the value A in the memory as well. Then, the routine proceeds to S914 to increment the value A by "1". Then, the routine proceeds to S916 to increment the value CRT by "1" as well. Then, the routine proceeds to S918 to judge whether or not the value A is greater than or equal to "2". A return is made to S908 because the value A is less than "2" also at this time.

At S908, $\theta t=39.5$ degrees, $\theta m=284$ degrees and $A=1$ are substituted into the expression (3) to calculate the motor rotational number B.

$$B = \{57.4 \times (39.5 + 360 \times 1) - 284\}/360$$
$$= 62.909$$

Subsequently, the routine proceeds to S910 to store the value B in the memory. Then, the routine proceeds to S912 to store the value A in the memory as well. Then, the routine proceeds to S914 to increment the value A by "1". Then, the routine proceeds to S916 to increment the value CRT by "1" as well. Then, the routine proceeds to S918 to judge whether or not the value A is greater than or equal to "2". At this time, because of A=2 and because the judgment is YES, the routine proceeds to S920.

At S920, selection is made for the value B which is the smallest in error of all of the values B. In this instance, the value B=62.909 is selected. This constitutes first selection means. The value A at that time is also selected at S922. In this instance, the value A which makes B=62.909 is A=1. This constitutes second selection means. Then, the routine proceeds to S924, at which the values $\theta t$ and A are substituted into the expression (1) for calculation of the absolute steering angle. At this time, $\theta t=39.5$ degrees and A=1 are substituted thereinto. Thus, the absolute steering angle is calculated as follows:

$$\text{Absolute steering angle} = 39.5 + 360 \times 1$$
$$= 399.5 \text{ degrees}$$

This constitutes second operation means.

The fraction in the aforementioned operations includes and represents the error in precision of the steering angle from the resolver of the torque sensor, the looseness in the gears connecting the handle with the electric motor, the error in absolute precision of the electrical angle of the resolver in the electric motor, and the like which have been discussed as the problem to be solved. As a specific value, the errors Er become Er=63−62.909=0.091.

The absolute steering angle $\theta$ of the handle 18 can be detected in the foregoing method. This enables an electric motor power assist control, a handle return control and the like which are well-known, to be performed successfully. Therefore, the following advantages can be attained according to the foregoing embodiment.

In a more preferred embodiment, the foregoing operations may be carried out based on the output of the second resolver 24 and the output of the motor resolver 41, in which case the torsional error of the torsion bar 20 can be eliminated so that the operations can be done more precisely.

In the foregoing embodiment, the absolute steering angle detection device is constructed by the first resolver 23 and the second resolver 24 of the torque sensor 22 for detecting the steering torque produced by the rotation of the handle 18, the motor resolver 41 for detecting the motor rotational angle of the electric motor 39 which is driven in dependence on the rotation of the handle 18, and the ECU 43 for executing the operation processing of the detection signals output from the respective resolvers 23, 24, 41. Then, the ECU 43 calculates the motor rotational angles by the use of the detection signals output from the respective resolvers 23, 24, 41. First, the ECU 43 selects a motor rotational angle which is the nearest to an integer of all of the calculated motor rotational angles, then selects a rotational number of the steering wheel which has brought about the motor rotational angle, and detects an absolute steering angle $\theta$ based on the selected rotational number of the steering wheel and the first detection signal. The first resolver 23 and the second resolver 24 for detecting the steering torque and the motor resolver 41 for detecting the motor rotational angle are commonly used as the absolute steering angle detection device, i.e., to serve as the first resolver 23, the second resolver 24 and the motor resolver 41 which are necessary for detecting the absolute steering angle $\theta$. Accordingly, unlike the prior art, it is unnecessary to additionally provide any rotational angle sensor thereby reducing the cost, so that the absolute steering angle θ can be detected successfully.

In the foregoing embodiment, the absolute steering angle detection device is constituted by utilizing all of the first resolver 23 and the second resolver 24 of the torque sensor 22 and the motor resolver 41. For example, where an attempt is made to detect the absolute steering angle of the handle 18 by using the motor resolver 41 only, the ECU 43 relying only upon the detection signal of the motor resolver 41 can judge nothing but a position which the motor shaft 28 as rotor takes within one frequency of the waveform given by the detection signal. Thus, it is difficult to identify the absolute steering angle of the handle 18. Further, although the detection of the rotational angle of the handle 18 can be done only by using the detection signal from the second resolver 24 of the torque sensor 22, the ECU 42 cannot identify the neutral position and cannot judge which ordinary number the peak of the waveform of the detection signal takes as counted from the neutral position.

On the contrary, in the present embodiment wherein the absolute steering angle of the handle 18 is detected by using all of the first resolver 23 and the second resolver 24 of the torque sensor 22 and the motor resolver 41, it can be realized to provide the absolute steering angle detection device and the absolute steering angle detection method for an electric power steering device which are precise even in the existence of the error in precision of the steering angle from the resolver of the torque sensor, the looseness in the gears connecting the handle with the electric motor, the error in absolute precision of the electrical angle of the resolver in the electric motor, and the like.

INDUSTRIAL APPLICABILITY

As described above, the absolute steering angle detection device and the absolute steering angle detection method for an electric power steering device according to the present invention are useful as those which can detect the absolute steering angle precisely even in the existence of the error in precision of the steering angle from the resolver of the torque sensor, the looseness in the gears connecting the handle with the electric motor, the error in absolute precision of the electrical angle of the resolver in the electric motor, and the like. In particular, the present invention is suitable to use as an absolute steering angle detection device and an absolute steering angle detection method for an electric power steering device which are provided with a resolver of a torque sensor for detecting the steering torque generated upon the rotation of a handle, a motor resolver for detecting the rotational angle of an electric motor which is driven in dependence upon the rotation of the handle and an ECU for performing the operation processing of the detection signals output from the respective resolvers.

The invention claimed is:

1. An absolute steering angle detection device for an electric power steering device characterized by comprising:
    a steering wheel;
    a motor for assisting the rotation of the steering wheel;
    first detection means for torque detection for detecting the steering torque of the steering wheel to linearly output a first detection signal in dependence on the rotational angle of the steering wheel;
    second detection means for detecting the rotation of a motor which is driven in dependence on the rotation of the steering wheel to assist the rotation of the steering wheel, to linearly output a second detection signal having a frequency different from that of the first detection signal;
    first operation means for calculating rotational numbers of the motor based on the first and second detection signals and the rotational number of the steering wheel;
    first selection means for selecting an appropriate rotational number from the rotational numbers of the motor calculated by the first operation means;
    second selection means for selecting a rotational number of the steering wheel which corresponds to the appropriate rotational number selected by the first selection means; and
    second operation means for calculating an absolute steering angle based on the rotational number of the steering wheel selected by the second selection means and the first detection signal.

2. The absolute steering angle detection device for an electric power steering device as set forth in claim 1, characterized in that the first and second detection means are constituted respectively by resolvers.

3. The absolute steering angle detection device for an electric power steering device as set forth in claim 1, characterized in that the first detection means is composed of at least two resolvers which do not take the same values during one rotation of the steering wheel.

4. The absolute steering angle detection device for an electric power steering device as set forth in claim 1, characterized in that the first selection means selects a numerical value which is the nearest to an integer.

5. The absolute steering angle detection device for an electric power steering device as set forth in claim 1, characterized in that the second operation means detects the absolute steering angle by addition means for adding the first detection signal to a value which is made by multiplying 360 with the rotational number of the steering wheel selected by the second selection means.

6. An absolute steering angle detection method for an electric power steering device including a steering wheel and a motor for assisting the rotation of the steering wheel, the method being characterized by comprising:
    a first detection step for torque detection, of detecting the steering torque of the steering wheel to linearly output a first detection signal in dependence on the rotational angle of the steering wheel;
    a second detection step of detecting the rotation of a motor which is driven in dependence on the rotation of the steering wheel to assist the rotation of the steering wheel, to linearly output a second detection signal having a frequency different from that of the first detection signal;
    a first operation step of calculating rotational numbers of the motor based on the first and second detection signals and the rotational number of the steering wheel;
    a first selection step of selecting an appropriate rotational number from the rotational numbers of the motor calculated by the first operation step;
    a second selection step of selecting a rotational number of the steering wheel which corresponds to the appropriate rotational number calculated at the first selection step; and
    a second operation step of calculating an absolute steering angle based on the rotational number of the steering wheel selected at the second selection step and the first detection signal.

* * * * *